(12) United States Patent
Effting et al.

(10) Patent No.: US 11,987,758 B2
(45) Date of Patent: May 21, 2024

(54) INTEGRATED OPERATION METHOD IN THE USE OF CATALYST IN CONVENTIONAL AND RESIDUE FCC UNITS

(71) Applicant: Petróleo Brasileiro S.A.-Petrobras, Rio de Janeiro (BR)

(72) Inventors: Marcel Effting, Rio de Janeiro (BR); Raquel Bastiani, Rio de Janeiro (BR); Allan Silvestre Knapik, Rio de Janeiro (BR); Radha Liliane Pinto Goncalves, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 18/072,435

(22) Filed: Nov. 30, 2022

(65) Prior Publication Data

US 2023/0174871 A1 Jun. 8, 2023

(30) Foreign Application Priority Data

Dec. 2, 2021 (BR) ...................... 10 2021 024424 0

(51) Int. Cl.
*C10G 11/18* (2006.01)
*G05B 13/04* (2006.01)

(52) U.S. Cl.
CPC .......... *C10G 11/187* (2013.01); *G05B 13/048* (2013.01); *C10G 2300/107* (2013.01); *C10G 2300/701* (2013.01)

(58) Field of Classification Search
CPC ...... C08F 220/06; C08F 222/385; C08K 3/34; C08K 7/24; C08K 9/08; C08K 9/12;
(Continued)

(56) References Cited

U.S. PATENT DOCUMENTS 6,828,153 B2 12/2004 Jonker et al.
2004/0067841 A1* 4/2004 Bartholic ............. C10G 11/182
502/64

FOREIGN PATENT DOCUMENTS

BR 112017011903 A2 1/2018

OTHER PUBLICATIONS

Boock et al. (2001) "Catalyst Design for Resid Cracking Operation: Benefits of Metal Tolerant Technologies", Studies In Surface Science and Catalysis, 134:201-208.
(Continued)

*Primary Examiner* — Ellen M McAvoy
*Assistant Examiner* — Chantel Graham
(74) *Attorney, Agent, or Firm* — Mintz, Levin, Cohn, Ferris, Glovsky and Popeo, P.C.

(57) ABSTRACT

The present invention refers to an integrated operation method of conventional and residue FCC units that applies a model developed for predicting the catalytic performance of residue FCC units with any content and quality of flushing for the correct prediction and optimization of process simulators for residue FCC units and refining production planning models. The application can be for individual studies in process simulators or in digital twins to mitigate the unreliability in the prediction of the original simulator for studies with wide alteration in the content and quality of the flushing. The other application consists of modifying the refining production planning models based on the simulation result obtained in the modified process simulators to predict the performance of the waste units operating for any variation in the content and quality of the flushing catalyst used. The refining production planning model allows: 1. Indicative of potential profitability gain; 2. Optimum replacement of virgin and flushing catalysts in the conventional and residue FCC units; 3. Better distribution of the flushing
(Continued)

content and flushing quality for FCC consumer units of the flushing system; 4. Quantifies the marginal value of flushing generated in the FCCs units that produce flushing; 5. Defines the best virgin catalyst budget and predicts the logistical costs of transporting flushing between the FCC units producing flushing and consuming flushing, considering all viable routes.

13 Claims, 3 Drawing Sheets

(58) Field of Classification Search
CPC ............ C09D 123/0869; C09D 129/14; C09D 133/02; C09D 133/062; C09D 133/26; C09D 5/00; C09D 5/082; C09D 7/40; C09D 7/61; C09D 7/66; G05B 13/048; C10G 11/18; C10G 11/182; C10G 11/187; C10G 2300/107; C10G 2300/701
See application file for complete search history.

(56) References Cited

OTHER PUBLICATIONS

Cerqueira et al. (Aug. 2003) "Fresh vs Flush Catalysts", Hydrocarbon Engineering, 8(8):21-26.
Gupta et al. (Aug. 2001) "Model for the Performance of a Fluid Catalytic Cracking (FCC) Riser Reactor: Effect of Feed Atomization", Chemical Engineering Science, 56(15)4489-4503.
Maholland, Michael K. (Jan. 2006) "Improving FCC Catalyst Performance", Petroleum Technology Quarterly, 11(2):41-42.
(2001) "Fluid catalytic cracking. In: Question and Answer Session on NPRA Annual Meeting", National Petrochemical and Refiners Association, New Orleans, pp. 101-109.
Salemo et al. (Mar. 13-15, 2016) "Combating the Negative Effects of Iron in the FCCU at Philadelphia Energy Solutions Refining and Marketing, LLC", AFPM Annual Meeting, pp. 1-26(28 pages).

* cited by examiner

INTEGRATED OPERATION METHOD IN THE USE OF CATALYST IN CONVENTIONAL AND RESIDUE FCC UNITS

CROSS-REFERENCE TO RELATED APPLICATION

This application claims priority to Brazilian Application No. 10 2021 024424 0, filed on Dec. 2, 2021, and entitled "INTEGRATED OPERATION METHOD IN THE USE OF CATALYST IN CONVENTIONAL AND RESIDUE FCC UNITS," the disclosure of which is incorporated herein by reference in its entirety.

FIELD OF INVENTION

The present invention refers to an integrated operation method of fluid catalytic cracking (FCC—Fluid Catalytic Cracking) and waste units comprising a model that uses a flushing catalyst in any content and quality in its units. The proposed method corrects the process simulators and the refining production planning models, improving the representation of the performance of FCC units, correctly predicting their catalytic performance for any content and quality of the flushing catalist produced in other FCC units. The method allows estimating the right amount of catalyst without waste and applied to conventional and residue FCC units. The method also allows a direct application in process simulators with individual application or in digital twin models, improving the quality of adherence between the model and the real unit data.

DESCRIPTION OF THE STATE OF THE ART

Traditionally, the use of flushing catalysts (Purchased Ecat—acquired balance catalyst) in the conventional fluid catalytic cracking (FCC—Fluid Catalytic Cracking) and waste units has two approaches. The first considers its use to reduce the accumulation of contaminating metals in the load with high residue content to mitigate their deleterious effects on the catalytic inventory, when increasing the processing of residue in the cargo (Fluid catalytic cracking. In: Question and Answer Session on NPRA Annual Meeting—National Petrochemical and Refiners Association, New Orleans, p. 101-109, 2001; SALEMO, P.; KIRCHGESSNER, D.; AIKMAN, J. "Combating the Negative Effects of Iron in the FCCU at Philadelphia Energy Solutions Refining and Marketing, LLC". In: AFPM Annual Meeting—AMERICAN FUEL & PETROCHEMIC MANUFACTURES, San Francisco, p. 1-28, 2016; BOOCK, L. T.; PETTI, T. F. "Catalyst Design for Resid Cracking Operation: Benefits of Metal Tolerant Technologies", Studies in Surface Science and Catalysis, v. 134, p. 201-208, 2001; US 200410067841A; MAHOLLAND, M. K. "Improving FCC catalyst performance", Petroleum Technology Quarterly, v. 11, n. 2, p. 41-42, 2006; CERQUEIRA, H.; MORGADO JR., E.; PIMENTA, R. "Fresh vs flush catalysts", Hydrocarbon Engineering, v. 8, n. 8, p. 23-26, 2003; GONÇALVES, R. L. P. et al. "Determinaçaõ do teor ótimo de flushing para a RFCC RLAM li a partir de testes em unidade ACE". Rio de Janeiro: PETROBRAS. CENPES.PDAB. TFCC, 2012. 54f.). The flushing catalyst modulates the inventory activity in these residue FCC units, as the virgin catalyst can be very active, resulting in high delta coke and excessive rise of dense phase temperature. The second includes the use of flushing catalyst to reduce the cost of replacing virgin catalyst even when there is no waste processing (Fluid catalytic cracking. In: Question and Answer Session on NPRA Annual Meeting—National Petrochemical and Refiners Association, New Orleans, p. 101-109, 2001; BOOCK, L. T.; PETTI, T. F. "Catalyst Design for Resid Cracking Operation: Benefits of Metal Tolerant Technologies", Studies in Surface Science and Catalysis, v. 134, p. 201-208, 2001). In common, both operations aim to allow a lower content of contaminating metals in the unit's catalytic inventory. Usually, the criteria for selecting the flushing catalyst and its content used in the catalytic inventory consider only the levels of contaminating metals such as nickel, vanadium, iron, sodium and calcium. The selection of flushing was not reported due to the effect of its catalytic performance on prediction/optimization in a FCC process simulator.

In general, the choice of these flushing catalysts is qualitative, considering in addition to the content of contaminating metals, the type of catalyst (manufacturer and technology), the content of rare earths and alumina and the Ecat activity. Others also consider as a criterion, the use of a flushing that is the same base formulation of the catalyst used in the target unit, or at least with a formulation that meets the same objectives and restrictions of the unit in which the flushing will be used.

Some studies performed catalytic tests to determine the ideal content of flushing (BOOCK, L. T.; PETTI, T. F. "*Catalyst Design for Resid Cracking Operation*: Benefits of Metal Tolerant Technologies", Studies in Surface Science and Catalysis, v. 134, p. 201-208, 2001; CERQUEIRA, H.; MORGADO JR., E.; PIMENTA, R. "Fresh vs flush catalysts", Hydrocarbon Engineering, v. 8, n. 8, p. 23-26, 2003; GONÇALVES, R. L. P. et ai. "Determinação do teor ótimo de flushing para a RFCC RLAM li a partir de testes em unidade ACE". Rio de Janeiro: PETROBRAS. CENPES.PDAB. TFCC, 2012. 54 f.), but this content is strongly related to the quality of the flushing (content of contaminating metals and type of catalyst) and the severity of deactivation of the unit using this flushing according to the characteristics of the processed atmospheric or vacuum waste. The worse the atmospheric/vacuum residue, the greater the need to increase the flushing added to the catalyst. For the best quality cargo, the ideal content of flushing was 40% (CERQUEIRA, H.; MORGADO JR., E.; PIMENTA, R. "Fresh vs flush catalysts", Hydrocarbon Engineering, v. 8, n. 8, p. 23-26, 2003). In another study (GONÇALVES, R. L. P. et al. "Determinação do teor ótimo de flushing para a RFCC RLAM li a partir de testes em unidade ACE". Rio de Janeiro: PETROBRAS.CENPES. PDAB.TFCC, 2012. 54f.), which included the emulation of the variation in the replacement rate, varying the content of contaminating metals in the mixtures of virgin catalyst with flushing catalyst, it was also noted similar results and indicated that an optimal percentage of flushing would be around 35%, where the condition of greater profitability was identified All these mentioned studies aimed at the use of flushing in a single unit. A broad study considering the integrated gains of the FCC diesel units, a supplier of flushing, with residue FCC units (RFCC), as a consumer of flushing, is not reported.

It is known that residue FCC process simulators have low adherence of their model to predict these units with variations in the content and quality of flushing catalyst when compared with data from the industrial plant. It occurs because the catalytic system of the process simulators is not adequately modeled with performance information for the use of any content and quality of flushing. The simulators, in cases of catalytic system changes, need a new calibration with process data to ensure some adherence of their model, and therefore, they are not very predictable when its catalytic system is changed with flushing comprising content and quality very different from the point at which the unit was calibrated.

Another problem is the production integration of flushings produced in conventional FCC units with residue FCC units.

Document BR 11 2017 011903-0 refers to a process for evaluating the catalytic performance of a porous solid. More particularly, the invention relates to a process for evaluating the catalytic performance of a fluidized catalytic cracking catalyst using a vapor diffusion technique.

In the work of LOPES, H. M. et al. (2015) "Modelagem e simulação de um reator de craqueamento catalitico (FCC riser) via fluidodinâmica computacional". Anais CONEPETRO. Campina Grande: Realize Editora, describes a modeling of a catalytic cracking reactor and a simulation thereof using the computational fluid dynamics technique. In the development of the model, some considerations were made, such as: instantaneous vaporization, adiabatic reactor and four lumps model. A model for the fluid dynamics of the catalytic cracking reactor was developed (riser) via CFD, in which it is possible to analyze the contours of each cracking product along the length of the reactor, as well as their compositions.

In the article GUPTA, A.; RAO, D. S. (2001). "Model for the performance of a fluid catalytic cracking (FCC) riser reactor: effect of feed atomization", Chemical Engineering Science, v. 56, p. 4489-4503, discloses a model for predicting conversions and yield patterns in the riser FCC considering heat transfer, gas oil vaporization, catalyst entrainment hydrodynamics, mass transfer, catalytic cracking kinetics and deactivation. This model mentions that it can predict the conversion pattern and yield achievable in a reactor of riser FCC as a function of feed atomization characteristics, reactor geometry, operating conditions, and feed and catalyst characteristics can be a very useful tool for better design and optimal operation.

In view of this, no prior art document discloses an integrated operation method of conventional and residue FCC units for optimal allocation of virgin and flushing catalysts of FCC such as that of the present invention.

So, in order to solve such problems, the present invention was developed, through an integrated operation method of the FCCs units, establishing an integrated way for the allocation of virgin and flushing catalysts between conventional diesel FCC units and residue FCC units, with the operation of these units guided by their catalytic performance in order to ensure the most profitable operation of this set of units. The present invention uses a model developed with the use of process simulators for the integrated optimization of refining aimed at value generating. The methodology allows the refiner to have a complete refining operation plan to optimize costs with FCC catalysts where the flushing produced in the FCCs is quantified and classified according to its quality and these flushing catalysts are consumed in the residue FCC units in order to increase the operational gain from refining, since it is an operating system that meets the capacities, specifications and functionalities required by the market.

The present invention has the advantage of ensuring the balance between generation and consumption of catalysts and logistical costs, thus ensuring the right amount of virgin and flushing catalyst with no waste and applied to conventional and residue FCC units. In addition to the rational use of flushing avoiding its disposal in landfills or cement plants.

BRIEF DESCRIPTION OF THE INVENTION

The present invention refers to an integrated operation method of conventional and waste fluid catalytic cracking units comprising (1) a model developed to predict catalytic performance with the use of any content and quality of flushing in the catalytic inventory of residue FCC units; (2) modification of the process simulator for residue FCC units with the model developed in (1) for operation with any content and quality of flushing in its catalytic inventory, which can be any process simulator, preferably the simulators: SimCraqOT, FCC-SIM™ or Hysys that have application in individual simulations or in Digital Twin models; (3) Use of an integrated operation system of conventional and residue FCC units. This system establishes a way for the allocation of virgin and flushing catalysts between the FCC and refining units based on the representation of the virgin and flushing catalysts performance in the process simulators developed in (2) along with the refining production planning models.

BRIEF DESCRIPTION OF DRAWINGS

The present invention will be described in more detail below, with reference to the attached figures which, in a schematic and not limiting of the inventive scope, represent examples of its realization. In the drawings, there are.

DETAILED DESCRIPTION OF THE INVENTION

The integrated operation method of conventional and residue FCC units, which system establishes a way for the allocation of virgin and flushing catalysts among the refining FCC units from the representation of the virgin and flushing catalysts performance in the process simulators along with refining production planning model. The refining production planning models receive information regarding the performance of the units estimated in the process simulator modified with the model proposed by this invention, the quantities and qualities of the flushing catalysts.

The integrated operation method of waste and fluid catalytic cracking units according to the present invention comprises:
(1) Model developed to predict catalytic performance using any content and quality of flushing in the catalytic inventory of the FCC units;
(2) Modification of the process simulator for residue FCC units with the model developed in (1) for operation with any content and quality of flushing in your catalytic inventory;
(3) Implementation of the model developed in (1) in process simulators (static simulators) such as: SimCraqOT, FCC-SIM™ or Hysys that have application in individual simulations or in Digital Twin models where such modified process simulators allow the improvement of of the digital twin models adherence of residue FCC units operating with any content and quality of flushing in its inventory. The model is applicable to refineries that have residue FCC units and digital twins;
(4) From the modification of the process simulators developed in (2), yield vectors were generated based on the models of the FCC units that use flushing, these vectors modified the refining production planning model due to variations in the content and quality of the flushing catalyst. The refining production planning model was also modified to estimate the quantities and qualities of the flushing catalysts made available by the FCCs producing flushing and its consumption in flushing consumer units. The refining production planning model was also modified in order to estimate the balance between flushing generation and consumption of different qualities, which is dependent on the load processed in the units and which is also the object of model optimization. The refining production planning model also predicts the logistical costs of moving the flushing to be sent to the flushing consumer units considering all viable routes.

The invention is applicable for two purposes: 1) Improving adherence of Digital Twin models in refineries that have residue FCC units to correct the performance prediction of process simulators with the proposed model for operating these units with any content and quality of flushing; and 2) Integrated operation system of conventional and residue FCC units to predict the integrated performance of refining units where there are units that produce flushing for flushing consuming units. In this system, the refining units may or may not be from the same company, since the proposed model for the performance of waste units is enough robust to predict the catalytic performance from any quality and content of flushing produced in other FCC units, and which may potentially be used in the waste unit, correctly predicting its catalytic performance for any content and quality of flushing and in the most cost-effective way. The system ensures that: 1. Indicative of potential profitability gain; 2. Optimum replacement of virgin and flushing catalysts in the conventional and residue FCC units; 3. Better distribution of the flushing content and flushing quality for FCC consumer units of the flushing system; 4. Quantifies the marginal value of flushing generated in the FCCs units that produce flushing; 5. Defines the best virgin catalyst budget and predicts flushing freight costs between flushing producing and flushing consuming FCC units.

The developed model proposes a generic representation of the quality of flushing catalysts, in which a correlation of the quality of these flushing catalysts is proposed as a function of the metal content and the catalyst content with technology that allows estimation by the accessibility property (Akzo Accessibility Index—AAI greater than 10), such as defined in U.S. Pat. No. 6,828,153B2, in its formulation. A unique correlation allows you to easily modify process simulators for simulation and optimization studies.

As a way of representing the observed experimental behavior for the flushing content in mixtures, the generic equation below (1) is proposed:

$$R = A + B \times \frac{(1 - \exp(\% F)^C)}{1 - \exp(1)} \quad (1)$$

Wherein:
R is a yield of the catalytic tests carried out to be modeled, which can be done either on a laboratory or pilot plant scale;
% F is the flushing content in the mixture;
A, B, and c are equation parameters estimated from catalytic test data, which may be laboratory tests or FCC pilot plant.
The limits of equation (1) are:

$$\%F=0\%, \text{ then } R=R_V \quad (2)$$

$$\%F=100\%, \text{ then } R=R_F \quad (3)$$

Wherein:
$R_V$ is the yield of pure virgin catalyst;
$R_F$ is the efficiency of the pure flushing catalyst (100% in the mixture).
Substituting these limits in equation (1) results:

$$R_V = A \quad (4)$$

$$R_F = A+B \quad (5)$$

Therefore, equation (1) becomes:

$$R = R_V + (R_F - R_V) \times \frac{(1 - \exp(\% F)^C)}{1 - E} \quad (6)$$

The advantage of equation (6) lies in discriminating the parameters by the behavior of pure catalysts: $R_V$ pure virgin catalytic performance; $R_F$ pure flushing catalytic performance. E, the effect of flushing on the mixture. This type of equation allows, for example, to change the virgin catalyst in the unit without having to repeat the entire experiment plan carried out. In this case, the $R_V$ parameter can be adjusted by delta in relation to the performance of the virgin catalyst of this experiment plan.

Thus, it is proposed to describe the terms $R_F$ and c of equation (6) as a function of the metal content and the catalyst content with high accessibility in the formulation of the flushing (effect of catalyst manufacturing technology). Therefore:

$$R_F = F_O + F_{Ni+V} \times (Ni+V) + F_{Technology} \times (\% \text{ Technology}) \quad (7)$$

Wherein:
Ni+V is the content of contaminating metals (Ni+V) in ppm;
% Technology is the catalyst content with technology that allows flushing to have accessibility (AAI greater than 10), and this parameter is 100% for catalysts with AAI greater than 10, and proportionally between 0 to 100% for catalysts with AAI less than 10.
Likewise:

$$c = c_O + Fc_{Ni+V} \times (Ni+V) + c_{Technology} \times (\% \text{ Technology}) \quad (8)$$

The term $R_V$ depends only on the performance of the virgin catalyst, while the terms referring to the influence of flushing, $R_F$ and c, were discriminated according to the metal content and the catalyst content with high accessibility in the formulation of the flushing.

Table 1 represents the parameters for determining the initial activity of the mixture and the equilibrium activity of the mixture. The proposed model also estimated the parameters referring to selectivity at constant conversion (Table 2) and quality of naphtha at constant conversion (Table 3).

The initial activity of the mixture showed positive parameters for a high content of a catalyst with high accessibility that indicates a more active catalyst, and the metal content indicates that the metals slightly increase the activity as a function of the activity of the metals to coke and gas. In the equilibrium condition, the $R_F$ parameter was positive for the content of a catalyst with high accessibility and negative for the metal content, indicating the deleterious effect of flushing metals in deactivating the catalytic system.

TABLE 1

Estimated parameters for the generic flushing usage model: initial and equilibrium activity of the mixture.

| | Misture Initial Activity | | | Misture Balancing Activity | |
|---|---|---|---|---|---|
| $R_V$ | | 82.4241 | $R_V$ | | 66.0005 |
| $R_F$ | $F_0$ | 59.401 | $R_F$ | $F_0$ | 37.5861 |
| | $F_{Ni+V}$ | 8.124E-04 | | $F_{Ni+V}$ | -7.0899E-04 |
| | $F_{Technology}$ | 16.505 | | $F_{Technology}$ | 23.1601 |

TABLE 1-continued

Estimated parameters for the generic flushing usage model: initial and equilibrium activity of the mixture.

| | Misture Initial Activity | | | Misture Balancing Activity | |
|---|---|---|---|---|---|
| C | $C_0$ | 0.513 | C | $C_0$ | 0.6814 |
| | $C_{Ni+V}$ | 3.758E-04 | | $C_{Ni+V}$ | 1.1354E-04 |
| | $C_{Technology}$ | 1.254 | | $C_{Technology}$ | -0.6220 |

Table 2 shows the pure flushing parameters (Fo, $F_{Ni+V}$ and $F_{Technology}$) and its effect on the mixture (c0, CNi+V and $C_{Technology}$) to determine the selectivity to products at constant conversion. The pure flushing parameters indicate that a high content of a catalyst with high accessibility ($F_{Technology}$) improves coke selectivity, while a high content of metals worsens (FNi+v), this trend clearly explains the background conversion (decrease in bottom yield) observed in the tests. The metal content worsens the selectivity to the main products and increases the hydrogen. Meanwhile, a high content of a catalyst with high accessibility ($F_{Technology}$) reduces the selectivity to ethylene and the main components of LPG, as expected, due to the reduction of the zeolite/matrix of the catalytic system. Regarding the effect of flushing in the mixture, a positive effect is verified for a high content of a catalyst with high accessibility ($c_{Technology}$) and a negative effect for the increase in metal content (CFNi+v).

The naphtha quality at constant conversion (Table 3) suggests an increase in the aromatic content with the increase in metal content (FNi+v), which provided an increase in MON and RON. The quality of the LCO (cetane number) at constant conversion (Table 4) shows an improvement in the cetane number with increasing metal content (FNi+v).

TABLE 2

Estimated parameters for the generic model of flushing use: selectivity to 65% conversion.

| | | | | | | | |
|---|---|---|---|---|---|---|---|
| $c_0$ | 0.543 | | $c_{Ni+V}$ | -7.863E-05 | $C_{Technology}$ | | 0.450 |
| Coke | Rv | 9.180 | Iso-butane | Rv | | | 0.834 |
| | Fo | 16.977 | | Fo | | | 0.919 |
| | FNi + V | 4.966E-04 | | FNi + V | | | -4.289E-05 |
| | $F_{Technology}$ | -4.075 | | $F_{Technology}$ | | | -0.263 |
| H2S | Rv | 0.732 | n-butane | Rv | | | 0.406 |
| | Fo | 0.552 | | Fo | | | 0.528 |
| | FNi + V | 1.227E-04 | | FNi + V | | | -2.160E-05 |
| | $F_{Technology}$ | -0.170 | | $F_{Technology}$ | | | -0.077 |
| Hydrogen | Rv | 0.647 | Iso-butene | Rv | | | 1.868 |
| | Fo | 0.882 | | Fo | | | 4.137 |
| | FNi + V | 1.775E-05 | | FNi + V | | | -2.438E-04 |
| | $F_{Technology}$ | 0.178 | | $F_{Technology}$ | | | -1.866 |
| Methane | Rv | 1.824 | 1-butene | Rv | | | 1.895 |
| | Fo | 2.458 | | Fo | | | 4.807 |
| | FNi + V | -1.669E-04 | | FNi + V | | | -3.799E-04 |
| | $F_{Technology}$ | 0.024 | | $F_{Technology}$ | | | -2.218 |
| Ethane | Rv | 1.067 | c-2-butene | Rv | | | 0.688 |
| | Fo | 1.358 | | Fo | | | 1.477 |
| | FNi + V | -8.207E-05 | | FNi + V | | | -8.668E-05 |
| | $F_{Technology}$ | 0.017 | | $F_{Technology}$ | | | -0.362 |
| Ethene | Rv | 1.006 | t-2-butene | Rv | | | 0.777 |
| | Fo | 1.495 | | Fo | | | 1.093 |
| | FNi + V | -1.752E-05 | | FNi + V | | | -5.614E-05 |
| | $F_{Technology}$ | -0.346 | | $F_{Technology}$ | | | -0.314 |
| Propane | Rv | 0.712 | butadiene | Rv | | | 0.007 |
| | Fo | 1.011 | | Fo | | | -0.012 |
| | FNi + V | -7.163E-05 | | FNi + V | | | 1.303E-05 |
| | $F_{Technology}$ | -0.136 | | $F_{Technology}$ | | | -0.005 |
| propylene | Rv | 3.421 | Bottom | Rv | | | 15.773 |
| | Fo | 5.749 | | Fo | | | 11.579 |
| | FNi + V | -1.044E-04 | | FNi + V | | | 4.864E-04 |
| | $F_{Technology}$ | -2.353 | | $F_{Technology}$ | | | 2.899 |

TABLE 3

Estimated parameters for the generic model of flushing use: naphtha quality at 65% conversion.

| | | | | | |
|---|---|---|---|---|---|
| $c_0$ | 0.295 | $c_{Ni+V}$ | −3.047E−04 | $C_{Technology}$ | 0.894 |
| MON | $R_V$ | 79.428 | Olefins | $R_V$ | 29.002 |
| | $F_0$ | 81.105 | in NC, | $F_0$ | 28.114 |
| | $F_{Ni+V}$ | 3.127E−04 | % m/m | $F_{Ni+V}$ | −1.221E−03 |
| | $F_{Technology}$ | −0.216 | | $F_{Technology}$ | −1.128 |
| RON | $R_V$ | 93.719 | Naphthenics | $R_V$ | 17.706 |
| | $F_0$ | 95.886 | in NC | $F_0$ | 16.037 |
| | $F_{Ni+V}$ | 2.942E−04 | % m/m | $F_{Ni+V}$ | −1.699E−04 |
| | $F_{Technology}$ | −0.216 | | $F_{Technology}$ | −1.133 |
| Benzene, | $R_V$ | 0.602 | Aromatics | $R_V$ | 41.175 |
| % m/m | $F_0$ | 0.747 | in NC | $F_0$ | 47.479 |
| | $F_{Ni+V}$ | −4.364E−05 | % m/m | $F_{Ni+V}$ | 1.670E−03 |
| | $F_{Technology}$ | −0.013 | | $F_{Technology}$ | 0.882 |
| Paraffin | $R_V$ | 11.363 | d15, 6/d15, | $R_V$ | 0.773 |
| in NC, | $F_0$ | 8.195 | 6 of NC | $F_0$ | 0.789 |
| % m/m | $F_{Ni+V}$ | −3.103E−04 | | $F_{Technology}$ | 4.013E−06 |
| | $F_{Technology}$ | 0.979 | | $F_{Tecnologia}$ | −3.565E−04 |

TABLE 4

Estimated parameters for the generic model of flushing use: LCO cetane number conversion of 65%.

| | | | | |
|---|---|---|---|---|
| Rv | 26.989 | e | | |
| Fo | 34.540 | Co | | 0.295 |
| FNi + V | 2.970E−03 | CNi + V | | −3.047E−04 |
| $F_{Technology}$ | −12.233 | $C_{Technology}$ | | 0.894 |

Table 5 shows the pure flushing parameters (Fo, FNi+v and $F_{Technology}$) and its effect on the mixture (co, CNi+V and $C_{Technology}$) to determine the yield of products at constant coke. The c parameters were maintained due to the high correlation with the coke selectivity of the constant conversion model, estimating only the parameters of pure flushing. These parameters indicate that a high content of a catalyst with high accessibility ($F_{Technology}$) reduces the yield of bottom, and the metal content (FNi+v) increases, this trend is clearly explained by the conversion of bottom observed in the tests.

TABLE 5

Estimated parameters for the generic model of flushing use: Yields at constant coke of 12% m/m

| | | | | | |
|---|---|---|---|---|---|
| $c_0$ | 0.543 | $c_{Ni+V}$ | −7.863E−05 | $C_{Technology}$ | 0.450 |
| Conversion | Rv | 74.941 | iso-butane | Rv | 1.343 |
| | Fo | 48.642 | | Fo | 0.534 |
| | FNi + V | −1.303E−03 | | FNi + V | −1.020E−04 |
| | $F_{Technology}$ | 12.526 | | $F_{Technology}$ | −0.080 |
| H2S | Rv | 0.993 | n-butane | Rv | 0.563 |
| | Fo | 0.346 | | Fo | 0.431 |
| | FNi + V | 1.046E−04 | | FNi + V | −4.170E−05 |
| | $F_{Technology}$ | −0.073 | | $F_{Technology}$ | −0.021 |
| Hydrogen | Rv | 0.741 | Iso-butene | Rv | 2.450 |
| | Fo | 0.591 | | Fo | 2.420 |
| | FNi + V | −1.838E−06 | | FNi + V | −5.245E−04 |
| | $F_{Technology}$ | 0.398 | | $F_{Technology}$ | 0.700 |
| Methane | Rv | 2.111 | 1-butene | Rv | 2.796 |
| | Fo | 2.132 | | Fo | 2.866 |
| | FNi + V | −2.295E−04 | | FNi + V | −7.095E−04 |
| | $F_{Technology}$ | 0.270 | | $F_{Technology}$ | 0.769 |
| Ethane | Rv | 1.087 | c-2-butene | Rv | 1.145 |
| | Fo | 1.319 | | Fo | 1.098 |
| | FNi + V | −8.545E−05 | | FNi + V | −2.940E−04 |
| | $F_{Technology}$ | 0.048 | | $F_{Technology}$ | 0.550 |
| Ethene | Rv | 1.082 | t-2-butene | Rv | 0.957 |
| | Fo | 1.534 | | Fo | 0.790 |
| | FNi + V | −3.078E−05 | | FNi + V | −2.029E−04 |
| | $F_{Technology}$ | −0.393 | | $F_{Technology}$ | 0.406 |
| Propane | Rv | 0.950 | butadiene | Rv | 0.020 |
| | Fo | 0.971 | | Fo | 0.002 |
| | FNi + V | −1.346E−04 | | FNi + V | 4.483E−07 |
| | $F_{Technology}$ | −0.097 | | $F_{Technology}$ | −0.003 |
| propylene | Rv | 5.168 | Bottom | Rv | 7.631 |
| | Fo | 4.648 | | Fo | 20.831 |
| | FNi + V | −5.755E−04 | | FNi + V | 2.845E−03 |
| | $F_{Technology}$ | −1.204 | | $F_{Technology}$ | −3.259 |

The estimated parameters for the quality of constant coke naphtha (Table 6) indicate a worsening of naphtha quality as a function of metal content (FNi+v); in this case the correlation is with lower naphtha yield at constant coke. The negative effect for a high content of a catalyst with high accessibility ($F_{Technology}$) is correlated with its formulation (lower zeolite/matrix ratio). Likewise, the quality of the LCO (cetane number) at constant coke (Table 7) shows an improvement in the cetane number with increasing metal content (FNi+v), due to the increase in the bottom yield at constant coke.

TABLE 6

Estimated parameters for the generic model of flushing use: Naphtha quality at constant coke of 12% m/m

| | | | | | |
|---|---|---|---|---|---|
| Co | −0.805 | CNi + V | 2.165E−04 | $C_{Technology}$ | 0.971 |
| MON | Rv | 83.279 | Olefins | Rv | 21.848 |
| | Fo | 82.226 | in the NC, | Fo | 23.463 |
| | FNi + V | −4.740E−04 | % m/m | FNi + V | −1.504E−04 |
| | $F_{Technology}$ | −1.410 | | $F_{Technology}$ | 4.270 |
| RON | Rv | 97.051 | Naphthenics | Rv | 12.984 |
| | Fo | 96.069 | in the NC, | Fo | 9.044 |
| | FNi + V | −1.140E−04 | % m/m | FNi + V | 1.509E−03 |
| | $F_{Technology}$ | −0.892 | | $F_{Technology}$ | 4.885 |
| Benzene, | Rv | 0.791 | Aromatics | Rv | 53.714 |
| % m/m | Fo | 1.193 | in NC, | Fo | 53.159 |
| | FNi + V | −1.442E−04 | % m/m | FNi + V | 1.161E−04 |
| | $F_{Technology}$ | −0.338 | | $F_{Technology}$ | −7.093 |
| Paraffins | Rv | 10.999 | d15.6/d15.6 | Rv | 0.795 |
| in the | Fo | 14.256 | from NC | Fo | 0.782 |
| NC, | FNi + V | −1.663E−03 | | FNi + V | 5.496E−06 |
| % m/m | $F_{Technology}$ | −2.369 | | $F_{Technology}$ | −0.004 |

TABLE 7

Estimated parameters for the generic model of flushing use: LCO cetane number at constant coke of 12% m/m

| | | | |
|---|---|---|---|
| Rv | 21.783 | e | |
| $F_0$ | 30.916 | Co | −0.805 |
| $F_{Ni+V}$ | 4.310E−03 | CNi + V | 2.165E−04 |
| $F_{Technology}$ | −8.240 | $C_{Technology}$ | 0.971 |

The model developed for predicting the catalytic performance of residue FCC units with any grade and flushing quality can be applied in process simulators and refining planning models. In this invention the model was applied with two objectives: 1) Improved adherence of Digital Twin models of residue FCC units operating with any flushing content and quality in its inventory; and, 2) integrated operation system of conventional and residue FCC units for the allocation of virgin and flushing catalysts between the units based on the representation of the performance of the virgin and flushing catalysts in the process simulators along with the refining production planning model.

Modification of process simulators in residue FCC units with the developed model can be implemented in process simulators such as SimCraq0r FCC-SIM™ or Hysys. Modified process simulators with the developed model allow the improvement of model adherence digital twin of residue FCC units operating with any content and quality of flushing in its inventory. The model is applicable to refineries that have residue FCC units and with Digital Twin.

The Digital Twin was implemented with KBC's PETRO-SIM™ simulator. Specifically for conventional and residue FCC process units, the simulator used is the FCC-SIM™ (PETRO-SIM™). This model uses yield information for the different production possibilities of the refining units based on data from the units or data simulated through the Digital Twin/PETRO-SIM™ process simulator, but other commercially available simulators can be used. For example, HYSYS and SIMCRAQOT Specifically for optimization studies of conventional and residue FCC units, where it is necessary to correctly predict the performance of the units, models in FCC-SIM™ depend on good calibrations and tuning. In general, using process data is sufficient for this calibration and tuning step. However, for residue FCC units, where it is usual to vary significantly the flushing content and quality, there is a lack of reliability in the FCC-SIM™ prediction model for this variable. There are also no reports of flushing catalysts selection by the effect of its catalytic performance on prediction/optimization in FCC process simulator.

The process simulator estimates the yield vectors as a function of catalyst replacement, flushing content and quality produced and consumed in conventional and residue FCC units. The unit simulations of these units use the updated process information through the Digital Twin models. The objective of using these models is to adhere to the operation of the unit, since the Identical Twin constantly updates operational variables such as reaction temperature (TRX), load temperature, load flow rates and quality, catalyst replacement, Ecat quality and lift vapors and rectification, in order to represent the real and current yields of the units.

The vectors of the conventional units of FCCs estimated in the process simulator inform the yield profile, the quality of the Ecat (flushing) produced and changes in dense phase temperature (TFD) due to the variation in catalytic inventory activity due to catalyst replacement. The vectors may or may not be optimized in order to meet operational restrictions, depending on the scenario in which the unit's performance is to be evaluated.

While the vectors of the residue FCCs units are estimated in the process simulator modified with the model proposed in this invention to correctly predict the performance of these units as a function of the operation with any catalyst replacement, content and quality of flushing. The modified simulator informs the yield profile and the amount of virgin and flushing catalyst consumed. The vectors may or may not be optimized in order to meet operational restrictions, depending on the scenario in which the unit's performance is to be evaluated.

The refining production planning model was modified in order to receive information regarding the performance of the units as a function of the variation in catalyst replacement, content and quality of flushing for each simulated unit. The model was also modified to determine the quantities and qualities of the flushing catalysts made available by the diesel FCC units. Therefore, the balance between flushing generation and consumption of different qualities was implemented in the refining production planning model, depending on the optimized load for each refining unit, as well as the representation of the logistical costs of moving the flushing to be sent to the residue FCC units, considering all possible routes. The system also ensures the right amount of catalyst without waste and applied to conventional and residue FCC units. The system also predicts the need to purchase or not flushing in case the production in the conventional FCC units is not sufficiently the optimized demand of the residue FCC units. The proposed system is applicable for refiners that have a set of diesel and residue FCC units, but also applicable to an individual refiner that wishes to buy and quantify the quality of a flushing available in the market.

EXAMPLES

The following examples are presented in order to more fully illustrate the nature of the present invention and the way to practice the same, without, however, being considered as limiting its content.

Example 1: Improved Adherence of Digital Twin Models of Residue FCC Units

The adherence improvement of refining Digital Twin models was evaluated with the implementation of a model developed with experimental data from a pilot plant, in the simulation of residue FCC units operating with any content and quality of flushing in process simulators.

After the general maintenance shutdown of the REFAP residue FCC unit U-300, it was started its departure procedure at the end of January 2021. However, due to problems with the Ecat silo bottom valve, it was only possible to load its catalytic inventory with an amount corresponding to approximately 10% of the total inventory; with the remaining 90% to complete the inventory being obtained from the flushing silo (composed mainly of Ecat from REPAR's conventional FCC unit (U-2200) and Ecat from REFAP's conventional FCC unit (U-03).

This change impacted U-300's performance and, consequently, adherence to its identical twin, due to the major change in both the formulation and the quality of the catalyst present in the inventory. Table 8 presents the quality of the virgin catalyst and its respective Ecats (area, accessibility (AAI), nickel (Ni) and vanadium (V) contents). Therefore, they were applied to the model proposed in this invention, a flushing with the following quality: % Technology=79% and with a Ni+V content of 3700 ppm.

TABLE 8

Quality of Ecats (area, accessibility, vanadium and nickel content) of REFAPU-03 and U-300 and REPAR U-2200 units.

| Unit | Area (m2/g) | AAI (%) | V (ppm) | Ni (ppm) |
|---|---|---|---|---|
| U-300REFAP | 121 | 8.9 | 7645 | 7159 |
| U-03 REFAP | 167 | 10 | 773 | 1349 |
| U-2200 REPAR | 138 | 6.9 | 1779 | 2913 |

(*) Ecat quality: REFAP U-300 - calibration data of the superday of Jul. 6, 2020 (0% of flushing); REFAP U-03 and REPAR U-2200 - average from November 2020 to December 2020.

REPAR's conventional FCC unit has a ZSM-5-based additive in its catalytic system, the purpose of which is to increase propylene and LPG yields through naphtha cracking. Consequently, the performance profile of the U-300 was influenced by the presence of this additive in its inventory after using a large amount of this flushing at the start unit. Therefore, in order to adjust the Digital Twin of the U-300, it was also necessary to adjust the ZSM-5 content (1.0%) in the FCC-SIM™ model.

As of Feb. 15, 2021, the adaptation of the Digital Twin of the U-300 unit was carried out by applying the adjustment of the crystal content of ZSM-5 in the FCC-SIM™ model and using the implementation of a model developed in this invention to the simulation of residue FCC units operating with any content and quality of flushing in process simulators. It is noteworthy, due to the particularity of this return to operation of the U-300 after the maintenance shutdown, that its catalytic inventory was gradually being changed as predominantly replacement of virgin catalyst was carried out, thus characterizing an operation in transient mode. Thus, the need for monitoring the Digital Twin model of the U-300 is highlighted for the continuous adjustment of the ZSM-5 content and the use of the model proposed by this invention in view of the ongoing change in the content and quality of the flushing until the complete replacement of the catalytic system. It is important to point out that the results obtained by the adjustments described above are not possible in the traditional way of simulation, due to the need for frequent recalibrations in transition periods of the catalytic system of the U-300.

In order to quantify the improvement obtained by using the flushing performance model in RFCC, an analysis of the adherence of the identical twin of the U-300 before and after the changes of Feb. 15, 2021 was carried out. For this purpose, data were obtained from the industrial plant and from the simulations of its Digital Twin referring to the cracked and average naphtha yields of the U-300 (real unit and identical twin) in a 2 h interval from Jan. 22, 2021 until Apr. 25, 2021. The following were excluded from the analysis, as a validation criterion: i) data in which the U-300 was operating with a load below 5100 m³/d; and, ii) periods in which the unit was in transient state, obtained by calculating the steady state (EE) of the U-300 and considering values below 95% that represent transient operation. Points in which the cracked naphtha yield of the identical twin was within an interval of ±3% v of the actual yield of cracked naphtha were considered to be adherent; while, for the average yield, the acceptance criterion is that the value is included within the range of ±2% v of the actual average yield. The computation of identical twin adherence is then calculated by averaging the time that cracked naphtha and average yields are within the range described above.

Figure 1:
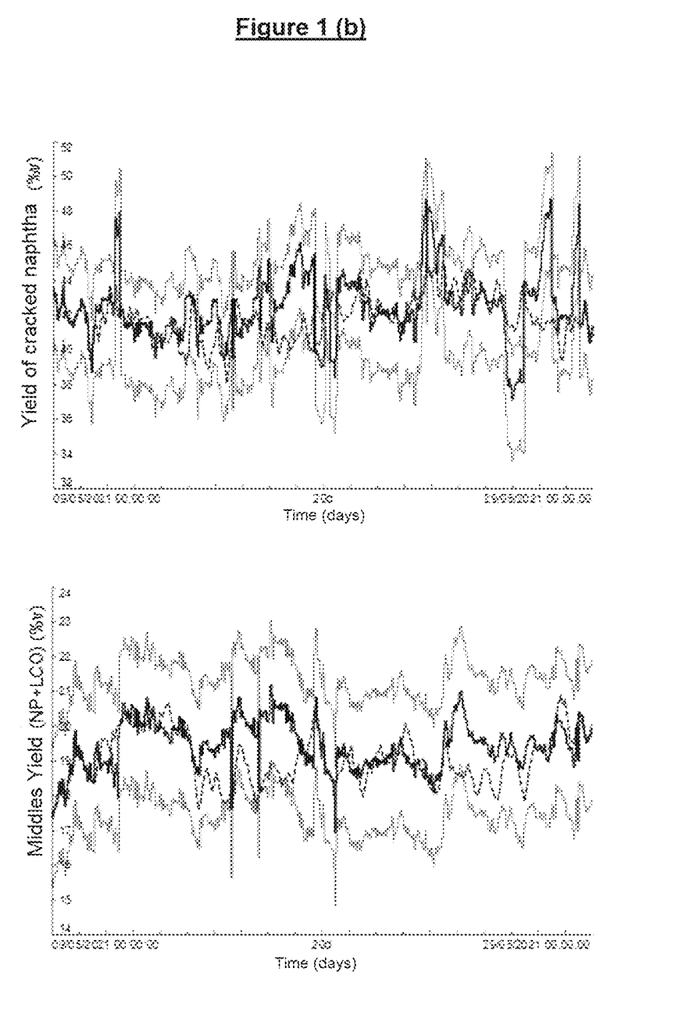
FIG. 1 illustrating a monitoring of the digital twin model adherence from the residue unit (U-300), FIG. 1 (a) before and FIG. 1 (b) after using the model of the present invention: cracked naphtha yields; and averages, where the following are represented: dashed line—real yield of the unit; solid black line—yield obtained by identical twin; solid gray lines: lower and upper limits of the optimal operating range obtained by the response of the monitoring model.
Figure 1A:
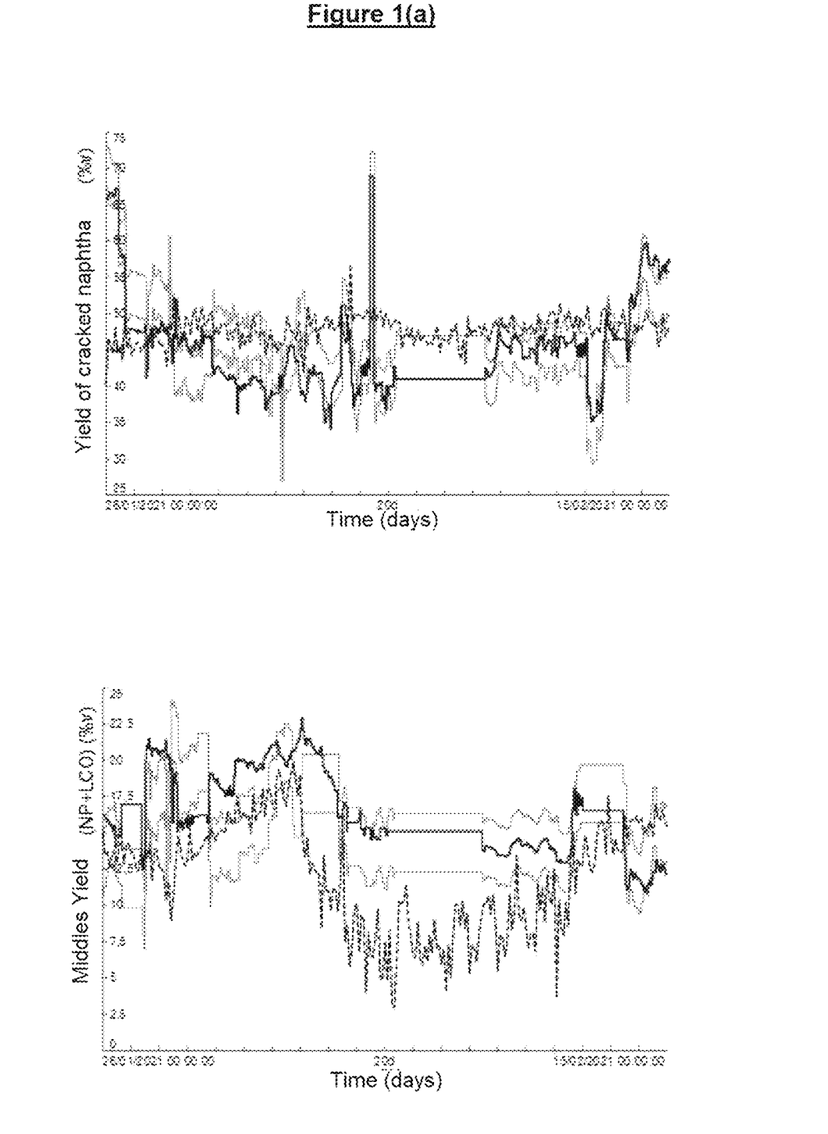

Using the graphic interface of the Digital Twin adherence panel (FIG. 1), the identical twin of the U-300 did not present a yield profile adequate to reality before the implementation of the model proposed in this invention, that is, up to Feb. 15, 2021. In this period, there was also no validated data before the implementation of the model proposed in this invention in the FCC-SIM™ process simulator. However, after applying the model proposed in this invention and adapting the ZSM-5 content in the inventory, there was a significant improvement in adherence, wherein the middles yield obtained a slightly better result than that of cracked naphtha.

Table 9 presents the adherence summary, in terms of time percentage with the yields framed in relation to the actual yields of the unit, before and after the changes in the identical twin to better represent the inventory and performance of the U-300, indicating that these adjustments allowed a 77.4% improvement in adherence.

TABLE 9

Identical twin tack of U-300 before and after changes made on Feb. 15, 2021.

| Adherence | Before the changes | After the changes |
|---|---|---|
| Cracked Naphtha, % | 0 | 73.0 |
| Middle, % | 0 | 81.8 |
| Identical twins, % | 00 | 77.4 |

Example 2: Integrated Operation System for Conventional and Residue FCC Units

This system establishes a way to allocate virgin and flushing catalysts among the refining FCC units based on the representation of the performance of virgin and flushing catalysts in the process simulators along with the refining production planning model.

Figure 2:
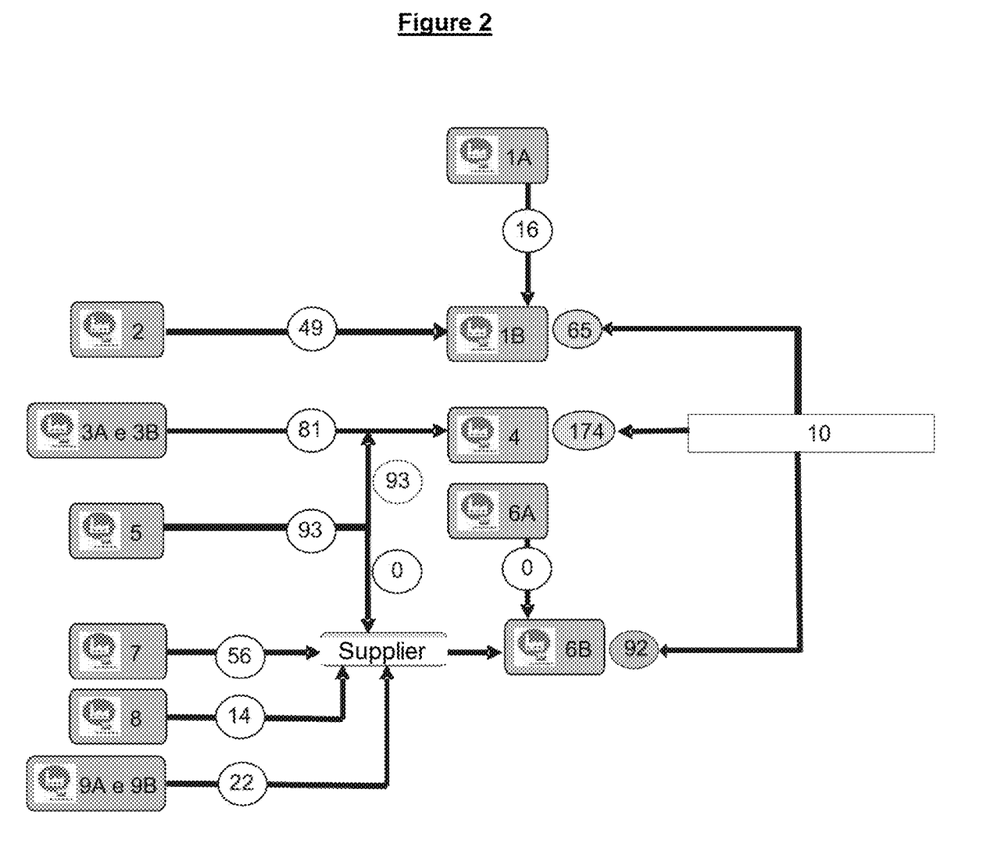
FIG. 2 illustrating a monthly availability of flushing for the Base Case and its components, being represented: REFAP refinery with a conventional FCC unit (1A) and a residue FCC (1B) REPAR refinery with a conventional FCC unit (2); REPLAN refinery with two conventional FCC units (3A and 3B); RECAP refinery with a residue FCC (4); REVAP refinery with a conventional FCC unit (5); RLAM refinery with a conventional FCC unit (6A) and a residue FCC (6B); RPBC refinery with a conventional FCC unit (7); REDUC refinery with a conventional FCC unit (8); REGAP refinery with two conventional FCC units (9A and 9B); imported flushing (10); blank circles with the amount of flushing produced in conventional FCC units and circled in gray with the amount consumed in residue FCC units.

Adopting the procedure described in this invention, vectors of yields and flushing production were considered for conventional FCC units with a range from −20% to +20% in relation to the base specific replacement simulated in the FCC-SIM™ process simulator for the load, base specific replacement and flushing content indicated in Table 10. FIG. 2 represents the current monthly distribution of flushing between conventional and residue FCC units.

TABLE 10

Base Case: planned load and base specific replacement for conventional and residue FCC units.

| UNs | Load (Mm3) (12 months) | Load (m³/d) | Specific replacement average (kg/m³) | flushing (%) content |
|---|---|---|---|---|
| Recap/U-570 | 1200 | 3287 | 3 | 60 |
| Reduc/U-1250 | 2300 | 6302 | 0.5 | |
| Refap/U-03 | 922 | 2527 | 0.7 | |
| Refap/U-300 | 2142 | 5868 | 1.9 | 16 |
| Regap/U-03 | 721 | 1977 | 0.7 | |
| Regap/U-103 | 1208 | 3309 | 0.7 | |
| Reman/UFCC | 0 | 0 | 0.56 | |
| Repar/U-2200 | 2687 | 7363 | 0.85 | |
| Replan/U-220 | 2523 | 6913 | 0.63 | |
| Replan/U-220A | 2992 | 8198 | 0.63 | |
| Revap/U-220 | 3538 | 9693 | 0.85 | |
| Riam/U-39 | 2977 | 8156 | 1.81 | 20 |
| Riam/U-6* | 3 | 3000 | 0.7 | |
| Rpbc/FCC | 2379 | 6518 | 0.9 | |

*A single day of scheduled operation in the Base Case

For residue FCC units, the yield and flushing consumption vectors considered, in addition to the replacement range from −20% to +20% in relation to the base specific replacement, the variation in the minimum flushing content of 0% and maximum of 50%, and two quality levels: best (Q1: % Technology=100% with Ni+V=769 ppm) and worse (Q2: % Technology=50% with Ni+V content=4838 ppm). All vectors were simulated in the FCC-SIM™ process simulator with the implementation of the model developed in this invention.

Tables 11 and 12 show the deltas of the FCC units' yield vectors as a function of the catalyst replacement variation in two levels: low replacement (−20%); and, high replacement (+20%), respectively. However, this range can be restricted, depending on operational restrictions. The objective of analyzing these tables is to establish which units are being most impacted in the yields due to the replacement of catalysts. The recommendation for replacement of the catalyst is the result of both the yield delta (unit performance) and the market volume. It is possible to observe that the REDUC, REPAR and REFAP U-03 units are the most impacted in the bottom yields (Tables 11 and 12) with the replacement variation, while the REPLAN U-220 and REPLAN U-220A units are the less impacted. However, the REPLAN U-220 unit is heavily impacted in terms of propylene yield.

In addition to the change in the yields of the FCC units as a function of the replacement practiced, the process simulator also indicated the best and worst Ecat produced, and its quantity produced per processed load. The best Ecat (Q1: % Technology=100% with Ni+V=769 ppm) was called flushing Q1, and the worst (Q2: % Technology 50% with Ni+V content 4838 ppm) flushing Q2

Residue FCC units were also evaluated according to the content and quality of flushing used. As the catalytic system of these units will vary considerably, it was decided to use vectors of residue FCC units optimized for operational variables (TRX, TCC and air enrichment). Table 13 presents the yield deltas for low replacement (−20%) operating with 0% of flushing and with 50% of flushing Q1 (good quality) or Q2 (worst quality) in the residue FCC units, while Table 14 presents the results for high replacement (+20%). The similarities and differences between the behavior of the residue FCC units can be explained by the difference between their specific replacement values, content and quality of reference flushing (base case) and the formulation of its virgin catalysts. It is necessary to point out that the formulation of the virgin catalysts of RECAP U-570 and REFAP U-300 are similar, and that of RLAM U-39 is significantly different from those due to its coke delta restriction.

For a 20% reduction in replacement, an increase in bottom yield is generally observed (Table 13), with the exception of RECAP U-570, which showed an indication of a reduction in bottom yield when operating only with virgin (0% flushing). This occurred because the reference value (base case) of this unit is 60% of flushing. For a high content of flushing, all units are impacted by the reduction in replacement, with REFAP U-300 being more impacted than RECAP and RLAM U-39. The difference between RECAP and REFAP can be explained by differences in specific replacement and the content of flushing between the reference values (base case) of these units. Replacement reference values are 3 kg/m3 and 60% of flushing for RECAP/U-570; and, 1.9 kg/m3 and 16% of flushing for the REFAP/U-300. Since both units have the formulation of their virgin catalyst, the ZIRCON 2043 catalyst in high concentration. The lower impact of replacing virgin catalyst with flushing in RLAM U-39 suggests that the catalytic performance of its virgin catalyst approaches the performance of the flushing, which can be verified by analyzing its virgin catalyst formulation with low activity for this unit. Therefore, the exchange of virgin catalyst for flushing is less impacted in this unit than in the others. The difference in quality of flushing also significantly impacts the performance of waste units, with REFAP being the most impacted, followed by RECAP and then RLAM. Increased catalyst replacement minimizes the significant increase effects of bottom yield caused by operating with a high content of flushing (Table 14). Reported trends for increased bottom yields are directly and negatively impacted for the other yields of residue FCC units such as LPG, propylene and naphtha.

TABLE 11

Deltas of yield and production vectors of flushing 01 and 02 due to replacement for FCC units: low replacement (−20%).

| UFCCs | REDUC | REFAP U03 | REGAP U03 | REGAP U103 | REPAIR | REPLAN U220 | REPLAN U220A | REVAP | RPBC |
|---|---|---|---|---|---|---|---|---|---|
| HLR | 0.0 | 0.0 | 0.0 | 0.0 | 0.0 | 0.0 | 0.0 | −0.015 | 0.0 |
| Chain C3 | −1.2 | 0.0 | 0.0 | 0.0 | −0.8 | −2.3 | 1.1 | −0.8 | −0.7 |
| PLG | 1.7 | 0.0 | −1.9 | −1.3 | −1.2 | 0.0 | 0.0 | −1.1 | 0.8 |
| propylene | 0.8 | −0.6 | 0.0 | 0.0 | −0.6 | −0.8 | −0.3 | −0.5 | −0.4 |
| GLP crack | 0.0 | −1.8 | 0.0 | 0.0 | 0.0 | 0.0 | 0.0 | 0.0 | 0.0 |
| NC | −1.0 | −1.4 | −1.1 | −0.5 | −0.7 | −0.7 | −0.1 | −0.8 | −0.4 |
| NP | 0.0 | 0.0 | 0.4 | 0.2 | 0.1 | 0.4 | 0.2 | 0.3 | 0.0 |
| LCO | 1.2 | 1.6 | 0.9 | 0.6 | 0.8 | 1.4 | 0.5 | 0.8 | 0.9 |
| HCO | 0.0 | 0.0 | 0.0 | 0.0 | 0.0 | 0.2 | 0.0 | 0.0 | 0.0 |
| Bottom | 1.7 | 1.1 | 0.9 | 0.7 | 1.3 | 0.3 | 0.2 | 0.8 | 0.7 |
| Rep. ESP (kg/m$^a$) | 0.40 | 0.56 | 0.56 | 0.56 | 0.68 | 0.50 | 0.50 | 0.68 | 0.72 |
| Flushing Q1 (kg/m$^3$) | 0.0425 | 0.1519 | 0.0807 | 0.0000 | 0.0599 | 0.1025 | 0.0880 | 0.0000 | 0.0000 |
| Flushing Q2 (kg/m$^3$) | 0.0175 | 0.0161 | 0.0313 | 0.1120 | 0.1147 | 0.0266 | 0.0632 | 0.2551 | 0.2160 |

TABLE 12

Delta of yield vectors as a function of replacement for FCC units: high replacement (+20%).

| UFCCs | REDUC | REFAP U03 | REGAP U03 | REGAP U103 | REPAIR | REPLAN U220 | REPLAN U220A | REVAP | RPBC |
|---|---|---|---|---|---|---|---|---|---|
| HLR | 0.0 | 0.0 | 0.0 | 0.0 | 0.0 | 0.0 | 0.0 | 0.008 | 0.0 |
| Chain C3 | 0.8 | 0.0 | 0.0 | 0.0 | 0.6 | 1.6 | 0.8 | 0.6 | 0.4 |
| PLG | 1.2 | 0.0 | 1.3 | 0.9 | 0.9 | 0.0 | 0.0 | 0.8 | 0.5 |
| propylene | 0.5 | 0.5 | 0.0 | 0.0 | 0.4 | 0.5 | 0.2 | 0.3 | 0.3 |
| PLG crack | 0.0 | 1.4 | 0.0 | 0.0 | 0.0 | 0.0 | 0.0 | 0.0 | 0.0 |
| NC | 0.4 | 0.6 | 0.6 | 0.4 | 0.4 | 0.2 | 0.0 | 0.5 | 0.2 |
| NP | 0.0 | 0.0 | −0.2 | −0.1 | −0.1 | −0.3 | −0.1 | −0.2 | 0.0 |
| LCO | −0.9 | −0.9 | −0.7 | −0.4 | −0.6 | −0.8 | −0.3 | −0.6 | −0.6 |
| HCO | 0.0 | 0.0 | 0.0 | 0.0 | 0.0 | −0.1 | 0.0 | 0.0 | 0.0 |
| Bottom | −0.9 | −0.6 | −0.5 | −0.4 | −0.8 | −0.2 | −0.1 | −0.5 | −0.4 |
| Rep. Spec. (kg/m$^a$) | 0.60 | 0.84 | 0.84 | 0.84 | 1.02 | 0.76 | 0.76 | 1.02 | 1.08 |
| Flushing Q1 (kg/m$^3$) | 0.0775 | 0.2499 | 0.1460 | 0.0260 | 0.1476 | 0.1737 | 0.1761 | 0.1312 | 0.1019 |
| Flushing Q2 (kg/m$^3$) | 0.0125 | 0.0021 | 0.0220 | 0.1420 | 0.1142 | 0.0198 | 0.0507 | 0.2514 | 0.2221 |

TABLE 13

Delta of yield and production vectors of flushing 01 and 02 due to replacement for residue FCC units: low replacement (−20%).

| Content and quality of flushing | 0% Flushing Q1/Q2 | | | 50% Flushing Q1 | | | 50% Flushing Q2 | | |
|---|---|---|---|---|---|---|---|---|---|
| Δ Yield (% v/v) | RECAP | REFAP U300 | RLAM U39 | RECAP | REFAP U300 | RLAM U39 | RECAP | REFAP U300 | RLAM U39 |
| HLR | 0.05 | | | −0.07 | | | −0.67 | | |
| Chain C3 | 0.98 | | | −1.16 | | | −2.27 | | |

TABLE 13-continued

Delta of yield and production vectors of flushing 01 and 02 due to replacement for residue FCC units: low replacement (−20%).

| Content and quality of flushing | 0% Flushing Q1/Q2 | | | 50% Flushing Q1 | | | 50% Flushing Q2 | | |
|---|---|---|---|---|---|---|---|---|---|
| Δ Yield (% v/v) | RECAP | REFAP U300 | RLAM U39 | RECAP | REFAP U300 | RLAM U39 | RECAP | REFAP U300 | RLAM U39 |
| PLG propylene | 0.62 | | −1.05 | −0.77 | | −2.66 | −2.56 | | −4.91 |
| PLG propylene | 0.64 | −1.16 | −0.12 | −0.75 | −3.40 | −0.30 | −1.47 | −5.04 | −0.44 |
| PLG crack | | −3.05 | | | −7.32 | | | −11.38 | |
| NC | 1.61 | −1.30 | −0.08 | −1.80 | −5.35 | −0.12 | −7.74 | −12.90 | −3.91 |
| NP | 0.00 | | 0.37 | 0.00 | | 0.49 | 0.00 | | 0.22 |
| LCO | −0.65 | 0.99 | 0.05 | 1.59 | 2.20 | 0.89 | 4.01 | 2.63 | 2.85 |
| Botton | −1.32 | 2.58 | 1.25 | 1.75 | 7.77 | 1.30 | 7.34 | 17.66 | 4.65 |
| Rep. Spec. (kg/m$^a$) | 2.394 | 1.810 | 1.450 | 2.394 | 1.810 | 1.450 | 2.394 | 1.810 | 1.450 |
| Flushing (kg/m$^3$) | 0.000 | 0.000 | 0.000 | −1.197 | −0.905 | −0.725 | −1.197 | −0.905 | −0.725 |

TABLE 14

Delta of yield and production vectors of flushing 01 and 02 due to replacement for residue FCC units: high replacement (+20%).

| Content and quality of flushing | 0% Flushing Q1/Q2 | | | 50% Flushing Q1 | | | 50% Flushing Q2 | | |
|---|---|---|---|---|---|---|---|---|---|
| Δ Yield (% v/v) | RECAP | REFAP U300 | RLAM U39 | RECAP | REFAP U300 | RLAM U39 | RECAP | REFAP U300 | RLAM U39 |
| HLR | −0.39 | | | −0.24 | | | −0.55 | | |
| C3 chain | 1.79 | | | 0.16 | | | −0.39 | | |
| PLG | 3.35 | | 2.89 | 2.14 | | 0.91 | 0.37 | | −1.55 |
| propylene | 1.16 | 2.32 | 0.23 | 0.11 | −1.29 | 0.05 | −0.25 | −2.72 | −0.04 |
| LPG Crack | | 5.63 | | | −1.71 | | | −5.86 | |
| NC | 3.81 | 1.77 | 1.27 | 1.42 | −1.28 | 1.33 | −3.04 | −6.99 | −1.81 |
| NP | 0.00 | | 0.01 | 0.00 | | 0.19 | 0.00 | | 0.21 |
| LCO | −2.44 | −1.84 | −1.67 | −0.56 | 0.89 | −0.85 | 1.92 | 2.44 | 1.30 |
| Bottom | −3.22 | −3.49 | −1.07 | −1.56 | 1.97 | −0.97 | 1.82 | 9.14 | 1.48 |
| Rep. Spec. (kg/m$^3$) | 3.592 | 2.715 | 2.175 | 3.592 | 2.715 | 2.175 | 3.592 | 2.715 | 2.175 |
| Flushing (kg/m$^3$) | 0.000 | 0.000 | 0.000 | −1.796 | −1.358 | −1.087 | −1.796 | −1.358 | −1.087 |

The yield vectors in Tables 11, 12, 13 and 14 have been updated in the refining production planning model. In addition, the premise of mandatory consumption of all the flushing produced was inserted. All routes (arcs) in FIG. 2 were made available. The modeling of the routes considered that any refinery with a conventional FCC unit could send flushing to any refinery with a residue FCC unit, even allowing the sending of flushing between refineries that have residue FCC units. The objective in this scenario was to verify how the indicated replacement would be in view of the availability of flushing in the units, without inducing previous biases of availability and use of flushing.

The refining production planning model then optimized the replacement of the conventional and residue FCC units, and considered a new balance and use of flushing in the residue FCC units in relation to what is usually performed. The optimized case indicated a potential gain of MMUS$ 26.9 in 12 months. As already described, this case considered the availability of flushing for residue FCC units between 0 and 50% flushing, with two qualities 01 (best) and 02 (worst) and with replacement variation of −20% and +20%. Table 14 shows that the refining total load indication varied little between the Base case and the Optimized case, with the exception of the REFAP/U-03 load. The catalyst budget varied significantly in refineries with residue FCC units (Table 16) as a consequence of the new replacement distribution (Tables 17 and 18) and the content and quality of flushing consumed by these units (Tables 19 and 20, respectively).

Optimization for conventional FCC units indicated, based on product market and yield delta (Tables 11 and 12), an increase in catalyst replacement on Refap/U-03, Revap/U-220, Regap/U-03, Regap/U-103 and Reduc/U-1250, and reduction in Replan U-220 and U-220A and Repar/U-2200 units (Tables 17 and 18). The reduction in replacement indicated at Replan's units can be explained by its lower impact on bottom yields when there is a reduction in catalyst replacement compared to the others (Table 11).

Optimization for residue FCC units indicated, based on product market and yield delta (Tables 13 and 14), an increase in the content of flushing in the Riam/U-39; in fact, this unit is the least impacted in terms of yield loss due to the use of flushing or by the reduction in catalyst replacement than the other residue FCC units (Table 13). And due to the mandatory consumption of all flushing produced in the refining production planning model. On the other hand, Refap/U-300 remained with the lowest flushing and with several months with indication not to use flushing in this unit. In fact, this is the residue FCC unit that is most impacted on the bottom yield due to the increase in the content of flushing or the worsen of the quality of flushing used, in relation to replacement reduction. Therefore, the refining production planning model tends to reduce the flushing in this unit and make available the flushing with better quality for it. The indication for Recap/U-570 is to operate the first semester with a high content of flushing and the second semester without flushing.

TABLE 15

Loads from conventional and residue FCC units.

| Units | Base | Optimized Case | Delta (%) |
|---|---|---|---|
| Recap/U-570 | 1198 | 1192 | −0.7% |
| Reduc/U-1250 | 2300 | 2307 | 0.3% |
| Refap/U-03 | 908 | 812 | −12.0% |
| Refap/U-300 | 2063 | 2172 | 1.4% |
| Regap/U-03 | 722 | 724 | 0.3% |
| Regap/U-103 | 1206 | 1208 | 0.0% |
| Reman/UFCC | 0 | 0 | |
| Repar/U-2200 | 2688 | 2699 | 0.4% |
| Replan/U-220 | 2523 | 2561 | 1.5% |
| Replan/U-220A | 2992 | 2992 | 0.0% |
| Revap/U-220 | 3521 | 3483 | −1.5% |
| Riam/U-39 | 2966 | 2979 | 0.1% |
| Riam/U-6 | 3 | 3 | 0.0% |
| Rpbc/FCC | 2352 | 2336 | −1.8% |
| Overall total | 25444 | 25468 | −0.5% |

TABLE 16

Catalyst budget.

| Virgin Catalyst Budget (MMR$) | Delta |
|---|---|
| Recap | 130.0% |
| Reduc | 11.5% |
| Refap | 23.6% |
| Regap | 17.0% |
| Repar | −12.7% |
| Replan | −17.0% |
| Revap | 18.5% |
| Riam | −42.0% |
| Rpbc | −2.8% |
| Total 4.3% | 4.3% |

TABLE 17

Specific catalyst consumption.

| Total Replacement (kg/m3) | Minimum | Base | Maximum | Optimized Scenario |
|---|---|---|---|---|
| RECAP/U-570 | 2.39 | 2.99 | 3.59 | 3.59 |
| REDUC/U-1250 | 0.4 | 0.5 | 0.6 | 0.56 |
| REFAP/U-03 | 0.56 | 0.7 | 0.84 | 0.84 |
| REFAP/U-300 | 1.81 | 2.26 | 2.72 | 2.72 |
| REGAP/U-03 | 0.56 | 0.7 | 0.84 | 0.83 |
| REGAP/U-103 | 0.56 | 0.7 | 0.84 | 0.81 |
| REPAR/U-2200 | 0.68 | 0.85 | 1.02 | 0.74 |
| REPLAN/U-220 | 0.5 | 0.63 | 0.76 | 0.53 |
| REPLAN/U-220A | 0.5 | 0.63 | 0.76 | 0.51 |
| REVAP/U-220 | 0.68 | 0.85 | 1.02 | 1.02 |
| RLAM/U-39 | 1.45 | 1.81 | 2.17 | 1.53 |
| RLAM/U-6 | 0.56 | 0.7 | 0.84 | 0.7 |
| RPBC/FCC | 0.72 | 0.9 | 1.08 | 0.88 |

TABLE 18

Catalyst consumption.

| Replacement of catalyst (%) | jan | feb | mar | apr | may | jun | jul | aug | sep | oct | nov | dec | Average |
|---|---|---|---|---|---|---|---|---|---|---|---|---|---|
| Recap/U-570 | 20 | 20 | 20 | 20 | 20 | 20 | 20 | 20 | 20 | 20 | 20 | 20 | 20 |
| Reduce/U-1250 | 20 | 20 | 20 | 20 | 0 | 20 | | 20 | 16 | 2 | 4 | −9 | 11 |
| Refap/U-03 | 20 | 20 | 20 | 20 | 20 | 20 | 20 | 20 | 20 | 20 | 20 | 20 | 20 |
| Refap/U-300 | 20 | 20 | 20 | 20 | 20 | 20 | 20 | 20 | 20 | 20 | 20 | 20 | 20 |
| Regap/U-03 | −3 | 20 | 20 | 20 | 20 | 20 | 20 | 20 | 20 | 20 | 20 | 20 | 18 |
| Regap/U-103 | −20 | 11 | 20 | 20 | 20 | 20 | 20 | 20 | 20 | 18 | 20 | 20 | 16 |
| Repair/U-2200 | −20 | −20 | 20 | — | 12 | −8 | −20 | −20 | −20 | −20 | −14 | −20 | −13 |
| Replan/U-220 | −20 | −20 | −20 | −20 | −20 | −20 | −20 | 20 | −20 | −20 | −7 | −20 | −15 |
| Replan/U-220A | −20 | −20 | −20 | −20 | −20 | −20 | −20 | −10 | −20 | −20 | −20 | −20 | −19 |
| Revap/U-220 | 20 | 20 | 18 | 20 | 20 | 20 | 20 | 20 | 20 | 20 | 20 | 20 | 20 |
| Riam/U-39 | −17 | −17 | −17 | −17 | −17 | −17 | −17 | −17 | −17 | — | 8 | −17 | −16 |
| Riam/U-6 | — | — | — | — | — | — | — | — | — | — | — | 0 | 0 |
| Rpbc/FCC | 8 | 3 | — | 20 | 4 | −7 | −10 | −9 | −6 | −9 | −1 | −8 | −2 |

TABLE 19

Flushing quality in the residue FCC units.

| Flushing Quality | jan | feb | mar | apr | may | jun | jul | aug | sep | oct | nov | dec | Average |
|---|---|---|---|---|---|---|---|---|---|---|---|---|---|
| recap/U-570 | 2 | 2 | — | 2 | 2 | 1.29 | — | 1.01 | 2 | — | — | — | 1.73 |
| Refap/U-300 | 1 | — | 1 | — | — | — | 1 | 1 | 2 | 2 | 1.87 | 1 | 1.45 |
| Riam/U-39 | 2 | 2 | 1.98 | 2 | 1 | 1 | 1 | 1 | 1 | — | 1.76 | 1.92 | 1.5 |

Best quality flushing 01 and assuming with quality 1; worst quality flushing 02 and assuming quality 2; flushings with intermediate quality assumed value between 1 and 2.

TABLE 20

Content of Flushing in the residue FCC units.

| Flushing content (%) | jan | feb | mar | apr | may | jun | jul | aug | sep | oct | nov | dec | Average |
|---|---|---|---|---|---|---|---|---|---|---|---|---|---|
| Recap/U-570 | 47 | 50 | 0 | 50 | 50 | 31 | 0 | 50 | 4 | 0 | 0 | 0 | 23 |
| Refap/U-300 | 20 | 0 | 18 | 0 | 0 | 0 | 2 | 29 | 28 | 41 | 26 | 30 | 16 |
| Riam/U-39 | 45 | 45 | 45 | 45 | 45 | 45 | 45 | 44 | 45 | — | 46 | 45 | 45 |

The optimization of the Optimized case considered the consumption of all flushing produced by the residue FCC units. Table 21 details the production and consumption of the best (Q1) and worst (Q2) flushings.

TABLE 21

Details of flushing production and consumption

| Flushing Q1 | Production (t) | Consumption (t) | Flushing Q2 | Production (t) | Consumption (t) |
|---|---|---|---|---|---|
| Recap |  | 263 | Recap |  | 711 |
| Reduc | 161 |  | Reduc | 31 |  |
| Refap | 203 | 526 | Refap | 2 | 423 |
| Regap | 132 |  | Regap | 184 |  |
| Repar | 202 |  | Repar | 309 |  |
| Replan | 551 |  | Replan | 255 |  |
| Revap | 455 |  | Revap | 876 |  |
| Riam |  | 1021 | Riam | 0 | 1034 |
| Rpbc | 106 |  | Rpbc | 511 |  |
| Total Flushing Q1 | 1810 | 1810 | Total Flushing Q2 | 2169 | 2169 |

Table 22 indicates the logistical cost of flushing for residue FCC units. The increase in the flushing content in the RLAM in the Optimized PLANAS case increased the logistical cost with the flushing for this unit in relation to the Base case. The lower freight cost for RECAP is due to the significant reduction in the predicted flushing content.

TABLE 22

Logistic cost of flushing.

| Freight Cost (MMR$/12 m) | Base PLANAB case | Optimized PLANAB case |
|---|---|---|
| Recap | 0.27 | 0.08 |
| Refap | 0.39 | 0.61 |
| Rlam | 1.70 | 3.24 |
| Total | 2.36 | 3.93 |

The example shown is just a representation, and may show other trends depending on different scenarios and needs, such as the flushing content available for the flushing consumer units, loads processed in the units and prices of refining products.

Therefore, it is worth mentioning that the methodology allows the improvement of adherence of Digital Twin models with the implementation of a model developed with experimental data from a pilot plant in the operation of residue FCC units operating with any content and quality of flushing in process simulators; indicate the potential profitability gain; determine the optimal replacement of virgin and flushing catalysts in the conventional FCCs units and residue FCC units in an integrated manner; define a better distribution of flushing content and quality in the residue FCC units of the system; and, budgets the virgin catalyst and predicts costs with flushing freight from conventional FCC unit to residue FCC units.

It should be noted that, although the present invention has been described in relation to the attached drawings, it may undergo modifications and adaptations by technicians versed in the subject, depending on the specific situation, but provided that it is within the inventive scope defined herein.

The invention claimed is:

1. A method comprising:
    developing a model to predict catalytic performance using any flushing content and quality in the catalytic inventory of residue fluid catalytic cracking (FCC) units;
    modifying a process simulator for residue FCC units with the model developed in (1) for operation with any flushing content and quality in its catalytic inventory;
    implementing the model into the process simulator to obtain a refining production planning model.

2. The method according to claim 1, wherein the developed model is represented by a correlation of the observed experimental behavior for the content of flushing in the mixtures, according to the equation:

$$R = R_v + (R_F - R_V) \times \frac{(1 - \exp(\%F)^C)}{1 - E}$$

wherein R is a yield of the catalytic tests carried out to be modeled, which can be done either on a laboratory or pilot plant scale, $R_V$ is the yield of pure virgin catalyst, $R_F$ is the efficiency of the pure flushing catalyst, % F is the flushing content in the mixture, and c is the flushing effect in the mixture.

3. The method according to claim 2, wherein the term $R_F$ is a function of the metal content and the catalyst content with high accessibility in the formulation of the flushing, according to equation:

$$R_F = F_O + F_{Ni+V} \times (Ni+V) + F_{Technology} \times (\% \text{ Technology})$$

wherein Ni+V is the content of contaminating metals (Ni+V) in ppm, % Technology is the catalyst content with technology that allows the flushing having high accessibility.

4. The method according to claim 2, wherein the parameter c is described as a function of the metal content and the catalyst content with high accessibility in the formulation of the flushing according to the equation:

$$c = c_O + Fc_{Ni\pm V} \times (Ni+V) + c_{Technology} \times (\% \text{ Technology})$$

wherein Ni+V is the content of contaminating metals in parts per million, % Technology is the catalyst content with technology that allows the flushing having high accessibility.

5. The method according to the claim 1, wherein the process simulator is static simulators in individual simulations or in digital twin models.

6. The method according to the claim 1, wherein the process simulator estimates yield vectors as a function of catalyst replacement, flushing content and quality produced and consumed in conventional and residue FCC units.

7. The method according to claim 6, wherein the vectors of the conventional FCCs units estimated in the process simulator inform the yield profile, the quality of the equilibrium catalyst—Ecat, (flushing) produced and changes in dense phase temperature due to the variation in catalytic inventory activity due to catalyst replacement.

8. The method according to claim 6, wherein vectors of the residue FCC units estimated in the modified process simulator correctly predict the performance of these units as a function of the operation with any catalyst replacement, content and quality of flushing.

9. The method according to claim 5, wherein the Identical Twin constantly updates operational variables such as temperature, load temperature, load flow rates and quality, catalyst replacement, Ecat quality and lift vapors and rectification, in order to represent the real and current yields of the units.

10. The method according to claim 1, wherein the modified process simulator informs the yield profile and the amount of virgin and flushing catalyst consumed.

11. The method according to claim 1, wherein the refining production planning model receives information regarding the performance of the units as a function of the variation in catalyst replacement, content and quality of flushing for each simulated unit.

12. The method according to claim 1, wherein the refining production planning model determines the quantities and qualities of the flushing catalysts made available by diesel FCC units.

13. The method according to claim 1, wherein the refining production planning model presents a balance between flushing generation and consumption of different qualities depending on the optimized load for each refining unit, as well as the representation of the logistical costs of moving the flushing to be sent to the residue FCC units, adding the routes that connect the units to the planning model.

* * * * *